United States Patent
Schlangen

(10) Patent No.: US 9,642,221 B2
(45) Date of Patent: May 2, 2017

(54) USER INTERFACE USING SOUNDS TO CONTROL A LIGHTING SYSTEM

(71) Applicant: PHILIPS LIGHTING HOLDING B.V., Eindhoven (NL)

(72) Inventor: Lucas Josef Maria Schlangen, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 47 days.

(21) Appl. No.: 14/356,652

(22) PCT Filed: Nov. 2, 2012

(86) PCT No.: PCT/IB2012/056117
§ 371 (c)(1),
(2) Date: May 7, 2014

(87) PCT Pub. No.: WO2013/076606
PCT Pub. Date: May 30, 2013

(65) Prior Publication Data
US 2015/0002046 A1    Jan. 1, 2015

Related U.S. Application Data

(60) Provisional application No. 61/556,318, filed on Nov. 7, 2011.

(51) Int. Cl.
| | | |
|---|---|---|
| G10L 21/00 | (2013.01) | |
| G06F 17/27 | (2006.01) | |
| H05B 37/02 | (2006.01) | |
| G05B 15/02 | (2006.01) | |
| G06F 3/0481 | (2013.01) | |
| G06F 3/0484 | (2013.01) | |
| G06F 3/16 | (2006.01) | |

(52) U.S. Cl.
CPC ......... *H05B 37/0236* (2013.01); *G05B 15/02* (2013.01); *G06F 3/0481* (2013.01); *G06F 3/04847* (2013.01); *G06F 3/167* (2013.01)

(58) Field of Classification Search
None
See application file for complete search history.

(56) References Cited

U.S. PATENT DOCUMENTS 4,630,248 A    12/1986  Scott
5,365,149 A    11/1994  Blakeslee et al.
(Continued)

FOREIGN PATENT DOCUMENTS

CN    101344228 A    1/2009
JP    2005209555A A   8/2005
(Continued)

*Primary Examiner* — Satwant Singh

(57) ABSTRACT

A user interface, a method, and a computer program product are provided for enabling a user to voice control over at least one setting of an apparatus such as a lighting system. The user interface determines a characteristic of an audio signal converted from vocal input of a user. A first setting of the apparatus is adjusted proportionally to a variation in the characteristic. Another setting of the apparatus may be adjusted on the basis of another characteristic of the audio signal. As a result, the user interface enables the user to control a lighting system over a substantially large or continuous range of output.

16 Claims, 4 Drawing Sheets

(56) References Cited

U.S. PATENT DOCUMENTS

| | | | |
|---|---|---|---|
| 6,392,357 B1 | 5/2002 | Wu | |
| 7,031,920 B2 | 4/2006 | Dowling et al. | |
| 7,546,173 B2* | 6/2009 | Waserblat | H04H 60/04 379/112.01 |
| 8,963,987 B2* | 2/2015 | Byun | H04N 7/147 348/14.08 |
| 9,230,542 B2* | 1/2016 | Velasco | G10L 25/63 |
| 9,304,988 B2* | 4/2016 | Terrell | G06F 17/2785 |
| 2010/0071535 A1 | 3/2010 | McKinney et al. | |
| 2010/0194314 A1 | 8/2010 | Sato et al. | |
| 2011/0140635 A1* | 6/2011 | Kim | H05B 37/0236 315/297 |
| 2011/0190913 A1 | 8/2011 | Van De Sluis et al. | |
| 2011/0204778 A1* | 8/2011 | Sadwick | H05B 33/0827 315/34 |
| 2014/0292215 A1* | 10/2014 | Sadwick | H05B 33/0827 315/192 |
| 2016/0225368 A1* | 8/2016 | Velasco | G10L 25/63 |

FOREIGN PATENT DOCUMENTS

| | | |
|---|---|---|
| WO | 9935637 A1 | 7/1999 |
| WO | 2009150592 A1 | 12/2009 |

* cited by examiner

USER INTERFACE USING SOUNDS TO CONTROL A LIGHTING SYSTEM

FIELD OF THE INVENTION

The invention relates to a user interface for controlling an apparatus, in particular an acoustic user interface for controlling a lighting system.

BACKGROUND OF THE INVENTION

Lighting systems may be controlled by various kinds of user interfaces. One kind of user interface enables a user to control the lighting system by pressing on switches or turning knobs. These tactile- or touch-based user interfaces work well when the user interface is physically located within reach of the user. But if the user interface is, e.g., located on another side of the room, the user cannot control the lighting system using this type of user interface.

Related to a different kind of user interface, Kim (US2001/0140635A1) discloses a lighting apparatus that executes a different light emission pattern depending on a sensed sound. See paragraphs [0047]-[0053] and FIG. 4. Specifically, the apparatus in Kim executes different light emission patterns in response to sensing different sounds such as "whistle", "snapping fingers", "clap" and "shouting", as seen in FIG. 4.

The lighting apparatus in Kim has several problems. One, the output of the lighting apparatus, i.e., the light emission pattern, is restricted to only a known and small number of patterns programmed to be executed in response to different sounds. Thus, the user control over the output is limited. Two, the user has to learn and remember which sound correspond to which light emitting pattern, making it harder for the user to use or remember how to use the lighting apparatus.

SUMMARY OF THE INVENTION

To alleviate at least one of the above mentioned shortcomings, an improved user interface, an improved method, an improved lighting system and an improved computer implemented method are provided.

Specifically, the disclosed systems and methods herein provide a user interface that enables a user to control a lighting system over a large, and/or substantially continuous range of outputs. For instance, certain characteristics of vocal/acoustic sounds or variations therein may drive, via the disclosed systems and methods herein, a lighting system in a particular direction, e.g., increasing the intensity of the output, decreasing the color temperature of the output, widening or narrowing (an opening angle of) a light cone, variation on a position of a light cone, etc. In some instances, the output of the lighting system may vary proportionally to a variation in a characteristic of the vocal input.

A variation in a characteristic advantageously is a variation within the maximum limits or boundary values that the characteristic may vary (e.g., changing a value within the upper and lower boundaries of a range of variation), allowing fine-tuned control of an output signal which may be used to control an apparatus. For example, a variation in the characteristic includes variations within a portion of the possible range in which the characteristic may vary.

A user interface for providing an output signal is disclosed. Said output signal may be adapted to control an apparatus. Said user interface comprises an audio processor and a controller. The audio processor may be configured to determine a first characteristic of an audio signal that is received from an acoustic sensor, wherein said audio signal is representative of an acoustic input produced by the user. The controller may be configured to generate an output signal wherein the output signal is varied proportionally to a variation in the first characteristic.

The sound input of the disclosure by Kim (document discussed in the background section) is based on distinctive discrete sounds (different kinds of sound/commands) that enable the switching between of pre-determined, small number of light emission patterns. By allowing relatively small variations in a characteristic of the acoustic input to control the lighting system, the disclosed systems and methods allow for continuous control of the light settings over a substantially continuous range of settings. For instance, gradual changes in e.g. tone of acoustic input enables for a very large, if not infinite, number of possible light settings, enabling a virtually continuous control of the lighting system.

Furthermore, the apparatus disclosed by Kim relies on commands that are not universal and may be hard to perform by certain people, thus decreasing the chance that every user is able to easily use the lighting apparatus (e.g. not everyone can snap their fingers loudly). The systems and methods according to embodiments of this invention use elementary acoustic sounds that most users can easily produce and vary.

In some embodiments, the audio processor is further configured to process the audio signal to derive a second characteristic of the audio signal. This second characteristic of the audio signal provides even further flexibility for the user in controlling the apparatus, e.g., by mixing variations in tone and loudness to control a setting of the apparatus.

In some embodiments, said variation in the first characteristic of the audio signal is related to a temporal change in a frequency component of the audio signal or a temporal change in an amplitude component of the audio signal. In some embodiments, said variation in the first characteristic of the audio signal is related to a change in a duration of a frequency component and/or an amplitude component being maintained over a period of time. As an illustration, a characteristic of the audio signal may be related to a frequency component (e.g., pitch or tone of voice), an amplitude component (e.g., intensity or loudness of voice), or a duration component (e.g. amount of time the voice maintains a certain property or number of repetitions observed in the vocal input) of the audio signal. The characteristic is preferably easy/intuitive for the user to vary in his/her (vocal/acoustic) input, such that the user may vary a characteristic of the audio signal to effectuate a variation in a setting of an apparatus.

In some embodiments, said audio processor is further configured to process the audio signal to determine whether the audio signal meets a trigger criterion. This trigger criterion preferably determines whether the acoustic input was accidental or not, for example determining whether the acoustic input has been provided for at least a certain number of seconds. The controller is (then) configured to generate the output signal in response to and/or after determining that the audio signal meets the trigger criterion. As such, the trigger criterion enables system to activate the controller for controlling the apparatus only when an non-accidental acoustic input (one that was intended by the user) is detected. In other words, if an accidental acoustic input is detected, that accidental acoustic input is not used to effectuate a variation in the setting of the apparatus or is ignored.

In some embodiments, the controller is further configured to generate the output signal in accordance with a variation in the second characteristic. Advantageously, another characteristic may be combined or used in conjunction with the first characteristic for controlling a (single) setting of the apparatus.

In some embodiments, said controller is further configured to adapt the output signal and/or generate another output signal on the basis of at least one of the first characteristic and the second characteristic. Advantageously, another setting may be controlled by the first and/or second characteristic. The other output signal may control another apparatus or the same apparatus as being controlled by the (first/original) output signal.

In some embodiments, the output signal is adapted to control at least one setting of the apparatus, the apparatus being a lighting apparatus, and said at least one setting comprising at least one of: a color setting, a hue setting, a saturation setting, a color temperature setting, an intensity setting, spectral setting, directionality setting, angular distribution setting. The control over a substantially large or possibly continuous range of settings for a lighting apparatus advantageously enables the user to easily vary the light output of the lighting system in an easy to use manner. Notwithstanding the above, the output signal may also be adapted to control at least one setting of other types of apparatuses that have a substantially large or possibly continuous range of configurable settings.

A system including at least one of a lighting apparatus and a sound apparatus is disclosed. Either or both apparatus are controllable by a user interface according to any of the methods described herein (or equivalents thereof).

A method for providing an output signal for controlling an apparatus is disclosed. An audio signal that is received from an acoustic sensor may be processed to determine a first characteristic of the audio signal, wherein said audio signal is representative of an acoustic input from the user. An output signal may be generated, wherein the output signal is varied proportionally to a variation in the first characteristic.

A computer program product, implemented on computer-readable non-transitory storage medium, the computer program product configured for, when run on a computing device, executing the method according to any of the methods disclosed herein.

When an output signal adapted to control an apparatus or a setting for an apparatus is adjusted in proportion or proportionally to a variation of a characteristic of the audio signal, the proportionality may be fixed by a constant factor. In some embodiments, the proportionality may vary depending on one or more non-linear function such as exponential functions, polynomial functions, etc.

These and other aspects of the invention will be apparent from and elucidated with reference to the embodiments(s) described hereinafter.

BRIEF DESCRIPTION OF THE DRAWINGS

Aspects of the invention will be explained in greater detail by reference to exemplary embodiments shown in the drawings, in which.

DETAILED DESCRIPTION OF EMBODIMENTS

This disclosure generally relates to a user interface. A user interface may comprise some hardware and/or software configured to enable a user to control a system or a device (i.e., configure the output of the system or the device). For example, a user interface may include at least one component which is, e.g., electrically coupled to the device. The device may also be remotely controllable by the at least one component.

At least one of those components is configured to receive user input (e.g., vocal input or acoustic input generated by a user), and generate an output (signal) that is adapted to drive or control a particular system, apparatus and/or device, e.g., by adjusting a setting of the particular system. In general, the driven system has perceivable output that is configurable through at least one setting of the system. The at least one setting is adapted to accept a (substantially continuous) range of values, where the range of values for the setting may correspond to a (substantially continuous) range of output levels of the system. The output levels are preferably ordinal in nature, e.g., having (gradual) levels from low to medium to high. The at least one setting may be referred to as a parameter of the system.

Figure 1:
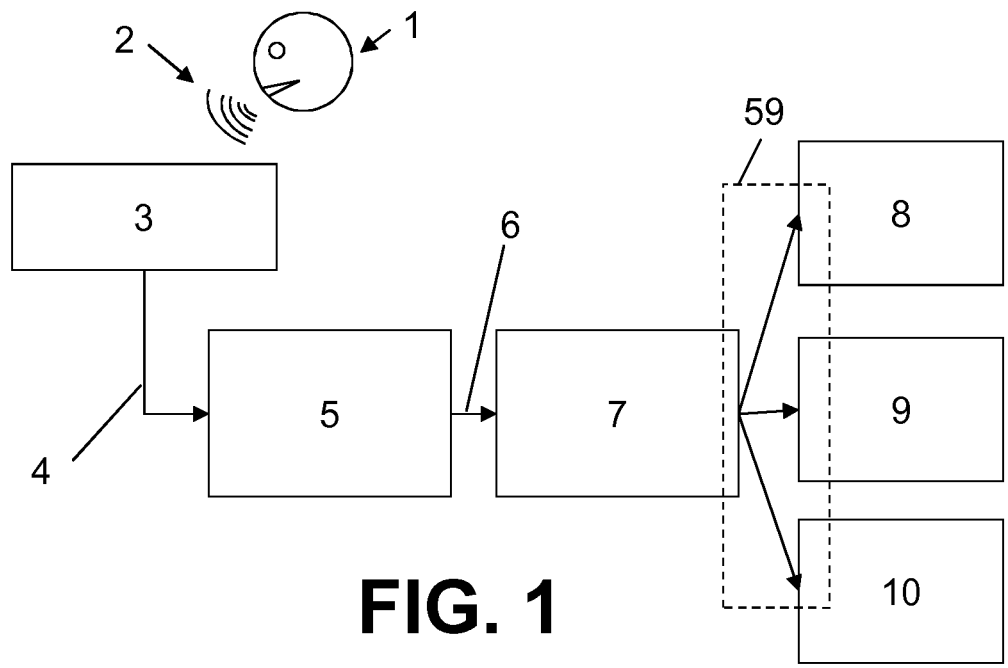
FIG. 1 shows an exemplary system for a user interface configured to control at least one apparatus.

FIG. 1 shows an exemplary system for a user interface configured to control at least one apparatus (or system). The exemplary system seen in FIG. 1 comprises acoustic sensor 3, audio processor 5, controller 7 and light output 8. Sound output 9 and other output 10 are optionally included in the system. The system enables user 1 to use his/her voice as vocal input 2 to control light output 8 over a substantially continuous range of outputs (i.e., output provided by the light output 8). For brevity, the disclosure discusses in detail the example of using the user interface to control a lighting apparatus, but one skilled in the art would appreciate that other types of apparatuses having a substantially continuous output such as sound output, temperature output, and haptic output may be controlled in a similar fashion.

At acoustic sensor 3, vocal input 2 (or acoustic input generated by a user) is received. Vocal input 2 may be in the form of sound waves traveling through the air to acoustic sensor 3. Exemplary vocal input includes "aaa", "ooo", "eee" sounds that are generated by the vocal chords of a human user or by the mouth such as whistling. Vocal input 2 is preferably universal and does not involve linguistic input such as words, phrases or other sorts of vocabulary. Advantageously, the user does not have to learn a set of vocabulary to control the system. Furthermore, using universal vocal or acoustic input generated by a user obviates the need for the system to learn parameters associated with the voice of the user in pronouncing certain words or phrases (e.g., learning whether the user is a man or a woman, speaking a particular language with a certain type of accent, etc.). In general, vocal input 2 preferably includes at least one of a (predominate) tone and loudness. While this disclosure focuses on "vocal input", other types of acoustic input producible by the user are also envisioned, such as acoustic input producible via a device or instrument (e.g., blowing whistle, harmonica, flute, etc.). Preferably, the acoustic input includes acoustic sound in which a user has control in producing the acoustic sound (i.e., user can effectuate a variable characteristic of the acoustic sound).

Acoustic sensor 3 is configured to convert the received vocal input 2 into audio signal 4. Audio signal 4 may be an electrical audio signal and may be an analog or digital signal that represents vocal input 2. Acoustic sensor 3 may be a microphone or any suitable sensor for sensing acoustic waves and converting the sensed waves into a signal. If any part of the system preferably processes audio signal 4 in a digital form, acoustic sensor 3 may be optionally equipped with an analog to digital (A/D) converter such that audio signal 4 is converted into a digital audio signal.

Once vocal input 2 is converted into audio signal 4, audio processor 5 processes audio signal 4 to determine at least one characteristic of the audio signal using any suitable audio analysis methods. For instance, audio processor 5 analyzes audio signal 4 to determine at least one characteristic (may be referred to as feature or quality) of the audio signal by performing, e.g., frequency, amplitude, time domain, and/or classification analysis.

A result from the analysis is provided as output 6 to controller 7. If audio signal 4 is analyzed for more than one characteristic, more than one result from the analysis may then be provided as part of output 6. In general, output 6 may represent at least one value associated with at least one characteristic. A characteristic may be representative of, e.g., a frequency component, an amplitude component, or a duration of a particular frequency or amplitude component being maintained over a period of time, etc.

Depending on the desired application, audio processor 5 may analyze audio signal 4 to determine characteristics related to frequency (e.g., pitch or tone of voice), amplitude (e.g., intensity or loudness of voice), or duration (e.g. amount of time the voice has maintained a certain property or number of repetitions observed in the vocal input). If a characteristic related to duration is desired at the output of audio processor 5, then audio processor may determine how a characteristic of the audio signal may or may not have changed over a period of time (e.g., keeping a count on how long a property is maintained, or a count on the number of repetitions of a sound at a certain interval with silence in between, wherein as long as the sound continues to be repeated, the output signal is varied proportionally to either counts).

Controller 7 adjusts at least one setting of light output 8 based on output 6. A variation in output 6 is representative of a variation in a characteristic of the audio signal. For instance, controller 7 generates at least one output signal (e.g., output signal 59) that is generated in accordance with a variation in a characteristic of the audio signal (e.g., a variation in output 6). The output signal generated by controller 7 is adapted to control lighting system 8. Exemplary settings that may be adjustable by an output signal of controller 7 include: a spectral composition setting, color setting, a hue setting, a saturation setting, a color temperature setting and an intensity setting, a directionality setting, an angular distribution setting, a temporal change in any one of the above, any combination of at least one of the above. For instance, output signal 59, which varies based on variations in the tone of vocal input 2, may drive an intensity setting of lighting apparatus 8.

In general, lighting apparatus 8 or other types of output devices may be configured to provide a range of (possibly a large number of) discrete values of output but advantageously the device is configured to provide a substantially continuous range of output as perceivable by a user of the system, e.g., light, sound, heat, speed, etc. The substantially continuous range of device output may be configured by at least one setting of the device that is adapted to be driven by a signal (e.g., output signal 59). For instance, a user may perceive a substantially smooth change in, e.g., intensity or color temperature of lighting apparatus 8 that is driven by an output signal generated by e.g., controller 7, wherein the output signal is generated in accordance with a change or variation in, e.g., a frequency component, an amplitude component, or an observed duration of the vocal input maintaining a certain frequency or amplitude.

Other types of output such as sound apparatus 9 may also be controlled in a similar manner. Further examples of types of apparatuses (shown as other 10) may include temperature/heat apparatus with configurable temperature output, a rotating fan with configurable speed output, appliances with a configurable output over a large, possibly substantially continuous range, etc.

In general, controller 7 generates an output signal (e.g., output signal 59) that may be adapted to control or adjust at least one setting of lighting apparatus 8 in a particular direction. For instance, the intensity of lighting apparatus 8 is controlled to increase by an amount in accordance with (preferably proportional to) a variation in a characteristic of the audio signal. As a result, the vocal input from a user controls lighting apparatus 8 over a large, possibly a substantially continuous output range.

In one embodiment, audio processor 5 is used to analyze the location of the sound in a large space (especially when using more then one acoustic sensors, placing them on various locations in a space). If more than one acoustic sensor is used, the acoustic sensor sensing the same sound with the highest intensity may indicate that the source of the acoustic sound (i.e., the user) is closest to that acoustic sensor. As such, audio processor 5 may control the apparatus or system that is closest to that particular acoustic sensor to react to the acoustic input (i.e., in that area where the acoustic input was generated). For instance in an open plan office, the light setting (e.g., of a particular apparatus or device) may be changed only in the area where the acoustic input is located, for instance coming from a particular (sound producing) worker at his/her desk. In another instance, the setting in that area may be varied more (e.g., amplified, or by the most amount when the proportionality is applied) as compared to other areas further away from the source of the acoustic input.

In one embodiment, when more than one acoustic sensor is used, the plurality of acoustic sensors may be used to derive or determine directional information on the acoustic input (rather than a location associated with the input). The direction information may be used to control the lighting or other suitable apparatus using that directional information, such as increasing the intensity of light in/towards that particular direction.

In some embodiments, the adjustment of the at least one setting of lighting apparatus 8 may be achieved by generating a new value for that setting. For instance, the generation of the new value may be based on a variation in output 6 (i.e., a characteristic of the audio signal) which serves as an input to a substantially continuous function. The function may be linear or non-linear. The generation of the new value may be calculated or determined based on output 6 or a variation in output 6 and a current value of a setting of light output 8, such that the setting of light output 8 (i.e., controlled by output 58) changes with respect to (or in relation to) the current actual value for that setting.

In some embodiments, the variation in the characteristic examines and/or is dependent on a moving average of a frequency envelope, examining a (slow) moving average spectral intensity of the signal. This slow moving average spectral intensity of the signal is in sharp contrast to the wildly varying spectral intensity variation in speech processing (i.e., consonants and vowels have extremely differing spectra, e.g., width, center frequency, etc.). In one instance, a long vowel, tone, or steady "hum" is generally constant i.e. not perfectly constant but only slowly moving with respect to the spectral intensity. In such embodiments, the center frequency may be related to the tone, intensity may be related to loudness, duration may be related to constancy (that is either substantially constant or showing a series of interruptions such as in "puhpuhpuhpuhpuh . . . ").

In a more specific embodiment, a characteristic of the frequency spectrum of the audio signal is determined. An output signal is then provided, wherein said output signal is proportional to a variation in the characteristic.

Note that a characteristic related to "width" (i.e., timbre, sound colour, fullness of sound) is not used since variation in width is what determines speech. In a clap or a (few) words there is no clear characteristic of the frequency spectrum, except a temporal variation of the frequency spectrum which determines the (succession) of letters and/or syllables.

In another embodiment, a first, second and third values of the characteristic are determined from the audio signal. The second value may be in between first and third values. An output signal advantageously has a variation proportional to the variation between the first, the second and third value.

Audio processor 5 and/or controller 7 may be at least partially implemented in hardware (e.g., on a dedicated chip for performing audio processing and control functions). Audio processor 5 and/or controller 7 may also be partly implemented as a computer implemented method configured to be executed on a computing device.

The user interface depicted in FIG. 1 enables a user to control the system (e.g., change a lighting effect or setting) over a substantially continuous range of perceivable output. The user interface may detect a variation in a characteristic in the vocal input, such as a change in tone, a change in loudness, an extension or duration of a particular tone or loudness being maintained. The variation in the characteristic may then be used to control, e.g., the brightness, hue, color, color temperature of a lighting system. For instance, an "aaaahhh" (low pitched) sound gradually changing to an "eeeeeeeeee" (high pitched) sound may change the intensity of a lighting system from a low setting to gradually a high setting. Advantages associated with various embodiments of the system are described in further detail below.

Figure 2:
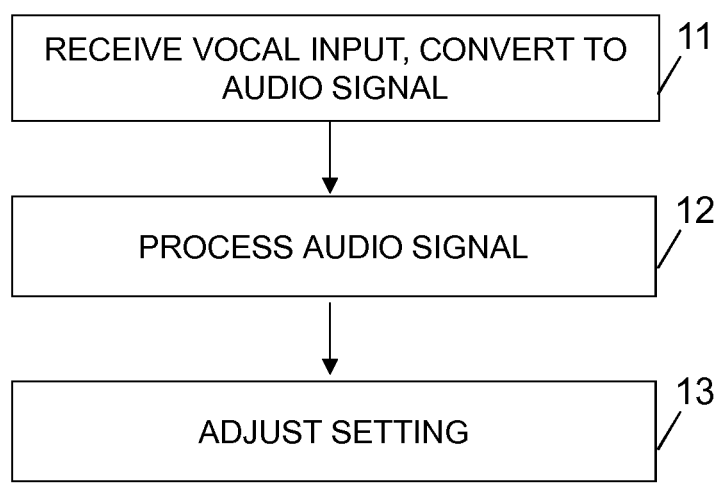
FIG. 2 shows a flow diagram depicting an exemplary method for providing a user interface.

FIG. 2 shows a flow diagram depicting an exemplary method for providing a user interface. An acoustic sensor part receives a vocal input or acoustic input generated by a user and converts the input into an audio signal (step 11). This step may be achieved by sensing sound waves generated by a user and converting the sensed soundwaves into an audio signal using, e.g., a microphone.

The resulting audio signal is then processed (step 12), such that at least one characteristic of the audio signal is determined. In some embodiments, the characteristic may relate to a frequency component, an amplitude component of the audio signal, or duration of maintaining substantially the same frequency or amplitude, or a combination thereof.

For instance, the audio signal may be analyzed to determine a predominant frequency. The audio signal may be processed periodically, e.g., through a time-series analysis, to determine a characteristic of the audio signal at each interval such that variations in the characteristic of the audio signal may be detected/determined. Such a time-series analysis on the characteristic of the audio signal may be performed at least partially in an audio processor or a controller.

A setting of a light output is advantageously adjusted (step 12). The setting may be adjusted by the use of an output signal generated in accordance with a variation in the characteristic of the audio signal. For instance, the output signal may vary in accordance with, e.g., proportionally to, a variation in a characteristic of the audio signal.

For instance, if a change in amplitude of 5% is determined, the intensity of the light output is changed by 5%. In another instance, if a change in (predominate) frequency of from 105 Hz to 85 Hz is detected, the color temperature of the light output may change based on a constant factor times the change in frequency (e.g., constant factor=100 Kelvin/Hz, change in frequency=−20 Hz, change in color temperature=−2000 Kelvin). In another instance, if a duration (e.g., 3 seconds) of a particular sustained low frequency tone is determined, the intensity of the light output may be decreased in proportion to the duration (or the extension thereof) of the observed characteristic of the audio signal being maintained from, e.g., 2 seconds to 3 seconds).

Figure 3:
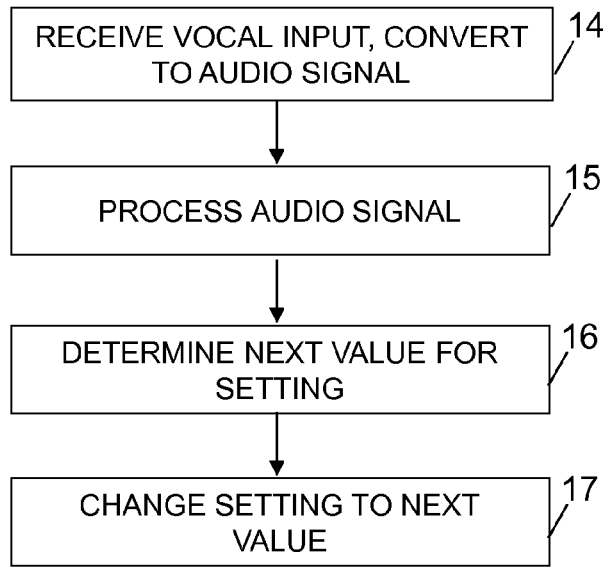
FIG. 3 shows a flow diagram depicting another exemplary method for providing a user interface.

FIG. 3 shows a flow diagram depicting another exemplary method for providing a user interface. An acoustic sensor part receives a vocal input and converts the vocal input into an audio signal (step 14, similar to step 11 of FIG. 2). The resulting audio signal is then processed (step 15, similar to step 12 of FIG. 2) by e.g., an audio processor, such that a characteristic of the audio signal is determined.

The adjustment of a setting of an apparatus may be implemented by means of updating the value of the setting with next (or new) value for that setting. A next value is determined for a setting of the apparatus (step 16). The setting of the apparatus is then changed to the next value (step 17) such that a change in the output of the apparatus is perceived in response to a variation in the characteristic of the audio signal.

The next value may be determined in different ways. In one embodiment, the next value is determined using a substantially continuous (linear or non-linear) function that maps the characteristic of the audio signal to a particular setting. The substantially continuous function enables the setting to be adjusted over a continuous range of values. Furthermore, the substantially continuous function advantageously enables a change detected in the audio signal (i.e., a temporal characteristic or a variation in the characteristic over time) to be reflected in a change or variation in the value for the particular setting. In some embodiments, the next value is determined based on the characteristic and a current value for the particular setting. For instance, the next value may be calculated based on a variation in the characteristic of the audio signal and added to or subtracted from the current value.

Figure 4:
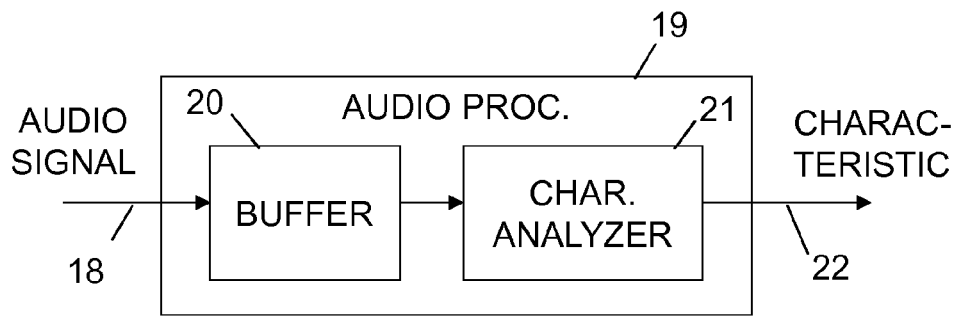
FIG. 4 is a schematic diagram of an illustrative audio processor.

FIG. 4 is a schematic diagram of an illustrative audio processor. In particular, audio processor 19 is implemented to determine at least one characteristic of an incoming audio signal (audio signal 18). Advantageously, audio processor 19 is implemented to extract characteristics that are generally present in elementary vocal sounds, such as sounds associated with vowels or other elementary or native acoustic sounds generated by a user. Characteristics may be related to a frequency component, an amplitude component, or a duration of the vocal sound maintaining a particular frequency or amplitude. Preferably, the sounds have a substantially continuous range of variations, such as variations in tone, loudness or duration.

By focusing on elementary vocal or acoustic sounds producible by a human user, at least one advantage may be achieved. A first advantage may be that vocal sounds travel over a distance and in a wide range of directions, enabling a user to exert control from a distance and at varied positions. Second, enabling vocal sounds to control a light output instead of buttons or hand controls avoids hygiene problems associated with touch-based user interfaces. Third, humans are able to easily and intuitively produce elementary vocal sounds and such sounds are generally universal across cultures and parts of the world. For instance, when a user changes the tone of his/her voice, the effect on the light source directly correspond to the change of the tone, making it easier for a user to learn how to control the light source without having to memorize a certain vocabulary or commands. Furthermore, without using a certain linguistic vocabulary, the system obviates the need for the user interface to learn the parameters of the user's voice. Fourth, elementary vocal sounds may be generated having substantially continuous characteristics which enables control of a lighting system over a wide range of substantially continuous light outputs. Fifth, providing a substantially smooth and continuous (perceivable) output being effectuated by the user input is more flexible and less limiting than providing a set of discretely different settings of the light output (e.g., certain light emission pattern settings).

Audio processor 19 determines at least one characteristic of audio signal 18 that is related to at least one of a frequency component of audio signal 18, an amplitude component of audio signal 18, and timing/duration of audio signal 18. To determine a characteristic of the audio signal (over time), audio processor 19 may include characteristic analyzer 21 for analyzing a plurality of samples of audio signal 18 and an optional buffer 20 for storing samples of audio signal 18.

If a characteristic associated with a frequency component of audio signal 18 is desired, audio signal 18 or samples thereof may be processed by at least one filter or processing unit in characteristic analyzer 21 to perform a frequency domain analysis on audio signal 18, e.g., Fast Fourier Transform or the like. Frequency components of audio signal 18 are generally related to the pitch or tone of the voice input. A frequency domain analysis performed in characteristic analyzer 21 may deduce a predominant frequency in the vocal range based on the frequency domain analysis (e.g. determine which band of frequencies has a highest amplitude).

If a characteristic associated with an amplitude component of audio signal 18 is desired, audio signal 18 or samples thereof may be processed to determine the amplitude of the overall signal or of a certain frequency component of audio signal 18. Amplitude component is generally associated with the loudness of the vocal input or of a particular (range of) frequency of the vocal input. If the amplitude of a certain frequency component is desired, then a frequency-domain analysis may be performed and the amplitude of a particular frequency component may be determined from the frequency-domain analysis.

If a characteristic associated with a duration of audio signal 18, sustaining/maintaining a certain frequency component or amplitude component, is desired, that characteristic is then determined for successive audio samples and stored over a period of time (e.g., for a plurality of audio samples of audio signal 18) to determine whether a frequency component or an amplitude component has substantially remained the same. For instance, an observed duration value or count may be updated based on each successive audio sample. If the audio signal has maintained substantially the same tone or loudness, or short bursts of the same sound is repeated, the observed duration or count may be incremented. Such incrementation may be considered as a variation in the characteristic of the audio signal (i.e., variation on the duration).

In general, the characteristic(s) for each audio sample in a series of audio samples (e.g., associated with a vocal input received over a period of time) may be analyzed in a controller to determine whether there is a trend or variation in the characteristic of interest. For instance, a controller may determine that there is an increase (of a certain amount) in the predominate frequency of the voice over a particular time interval. In another instance, a controller may determine that there is a decrease (of a certain amount) in the predominate frequency of the voice over a particular time interval. In yet another instance, a controller may determine that there is substantially no change in the predominate frequency of the voice over a particular time interval.

Figure 5:
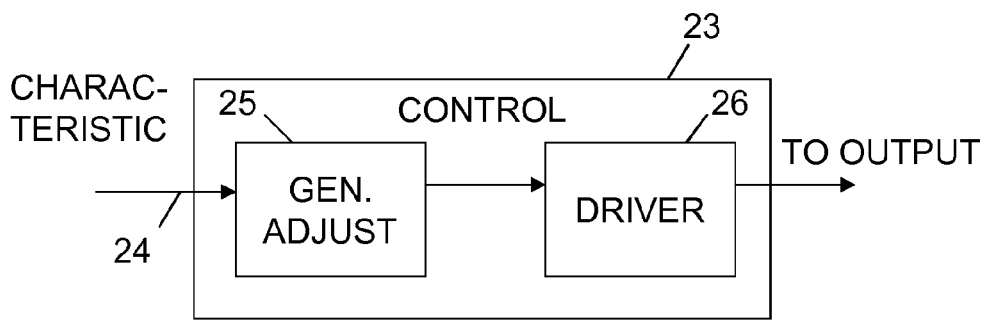
FIG. 5 is a schematic diagram of an illustrative controller.

FIG. 5 is a schematic diagram of an illustrative controller. There are several ways in which characteristics of the audio signal may control a system. For instance, individual characteristic of the audio signal or a variation therein may control at least one setting of the system. In another instance, a plurality of characteristics or a variation therein may control a single setting of the system. In general, controller 23 includes adjustment generator 25 and driver 26.

Adjustment generator 25 is configured to receive input 24 that is representative of at least one characteristic of an audio signal from an audio processor. Input 24 preferably includes a value which indicates the magnitude associated with the characteristic. A variation in the characteristic may be determined by observing a trend in input 24. Adjustment generator 25 determines a new value for a setting of the system on the basis of input 24. Advantageously, the new value for the setting reflects (preferably proportionally) a variation in input 24, such that the variation in the characteristic corresponds to also a variation, e.g. a substantially continuous change, in the setting of the system. The new value is then provided to driver 26 to signal a change in setting of an apparatus, e.g., issuing a command or changing the configuration of the apparatus to effectuate the new value for the setting.

In one embodiment, the adjustment of a particular setting may be generated on the basis of multiple inputs including at least one of: a value of a first characteristic of the audio signal and a variation in a second characteristic of the audio signal. For instance, a first characteristic of the audio signal may indicate which setting of an apparatus should be adjusted, and the variation in a second characteristic of the audio signal may enable the particular setting to be changed in proportion to the variation.

In some embodiments, adjustments of a plurality of settings may be generated independently for each input. Driver 26 may be configured accordingly to adjust a plurality of settings. The plurality of settings may be associated with a single output or a plurality of outputs.

In one embodiment, one characteristic of the audio signal (e.g., a variation therein) may control two settings of the system. When a user starts producing a very soft vocal sound, like "aaaa", on a low tone (low frequency), the user may observe that the a lighting system is illuminating with a very low intensity and relatively warm colour (temperature). A rather intimate lighting atmosphere results. When the user then varies the vocal sound by raising the height of the tone (increasing the frequency of the "aaa" sound produced), the user may observer that the lighting system reacts by increasing the light intensity and possibly also move to a more cool colour (temperature). As long as the user keeps increasing the height of the tone, the systems will keep increasing the light intensity and colour temperature until the vocal frequency of the user no longer increases (or the maximum intensity of the light has been reached). Eventually, after increasing the tone high enough, a very bright and cool (e.g., beach like) light setting will result. One skilled in the art would appreciate that instead of color temperature control from warm to cold, also color control from warm colors (red) to cool colors (blue) is envisioned.

In another embodiment, two characteristics of the audio signal control different settings of the system. The user may change the vocal sound the same way as in the previous example, but now the frequency of the vocal sound is used to independently control the spectral composition (e.g. colour temperature) while an amplitude of the sound independently controls the intensity of the light, or vice versa. For instance, changing towards a soft "aaaa" sound yields a lower light intensity, and changing to a harder sound results in a higher light intensity. Changing to a lower "aaaa" tone results in a warmer colour (temperature) and changing to a higher "aaaa" tone results in a cooler colour (temperature).

In yet another embodiment, an observed duration of a certain frequency component may also control a setting of the system. For instance, the controller may lower the color temperature setting as long as a low frequency tone is maintained, or the controller may increase the intensity setting as long as a loud sound is maintained.

Figure 6:
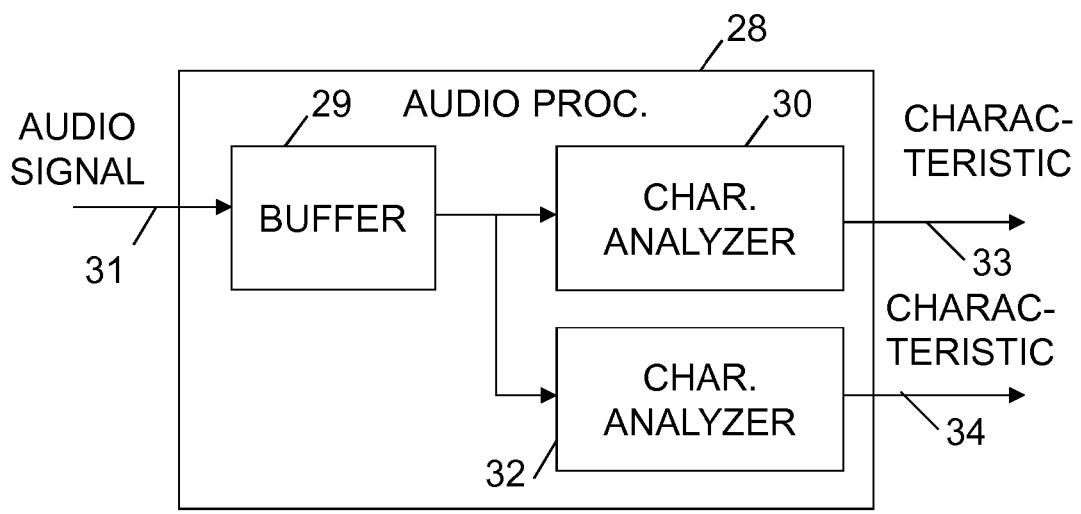
FIG. 6-7 are schematic diagrams of various embodiments of the audio processor.

FIG. 6 is a schematic diagram of an embodiment of the audio processor. In this embodiment, audio processor 28 comprises optional buffer 29, and a plurality of characteristic analyzers (char analyzer 30,32). Buffer 29 receives audio signal 31, and the output of buffer 29 may be provided to separate characteristic analyzers such that a plurality of characteristics of the audio signal may be observed/determined (output 33, 34). Therefore, if desired, audio processor 28 may analyze multiple characteristics 33, 44 of the audio signal 31 simultaneously. The skilled person will appreciate that instead of using multiple characteristic analyzers, parallel processing techniques within one characteristic analyzer may be used.

Figure 7:
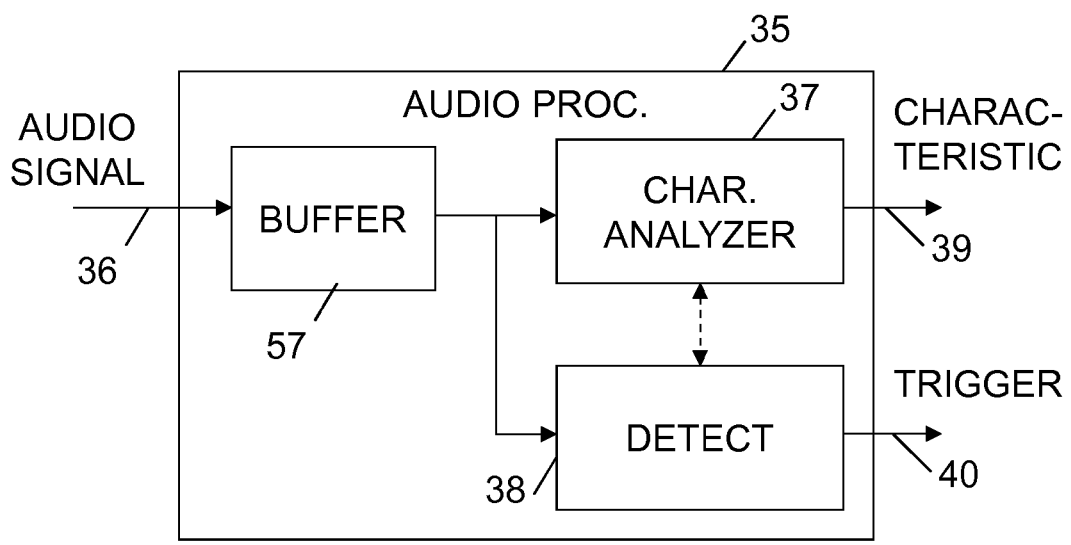

FIG. 7 is a schematic diagram of another embodiment of the audio processor. In this embodiment, a specialized characteristic analyzer is implemented to detect whether audio signal 36 meets a certain (trigger) criterion. Audio processor 35 includes optional buffer 57, characteristic analyzer 37 and detection part 38. Characteristic analyzer 37 is configured to determine a characteristic (output 39) of audio signal 36. Furthermore, detection part 38 performs processing on audio signal 36 to determine whether the controller should be activated to effectuate a change in the setting based on the determined characteristic. For instance, detection part 38 may be configured to determine a characteristic of the audio signal associated with a duration of the audio signal maintaining a certain characteristic. A (trigger) criterion may be defined for determining whether that duration meets a particular threshold (or any suitable condition or rule). If the criterion is met, (trigger) signal 40 is sent to, e.g., activate the controller. In a variation on this embodiment, detection part 38 may control whether characteristic analyzer 37 should be activated to process audio signal. In another variation, detection part 38 may be implemented as part of characteristic analyzer 37 such that the characteristic of the audio signal being determined in characteristic analyzer 37 is used for determining whether the criterion is met.

In one embodiment, the observed duration of the vocal input dictates whether the system should react to a characteristic of the vocal input. For instance, the system may responds only when the "aaaa" tone is kept for more than 3 seconds. This embodiment may advantageously filter and disregard vocal input that is too short, accidental, or unintentional. Requiring a long duration to be detected before making changes to, e.g., a lighting system, avoids the problem of changing the output or surprising/shocking the user when the user did not intend to change the output.

Figure 8:
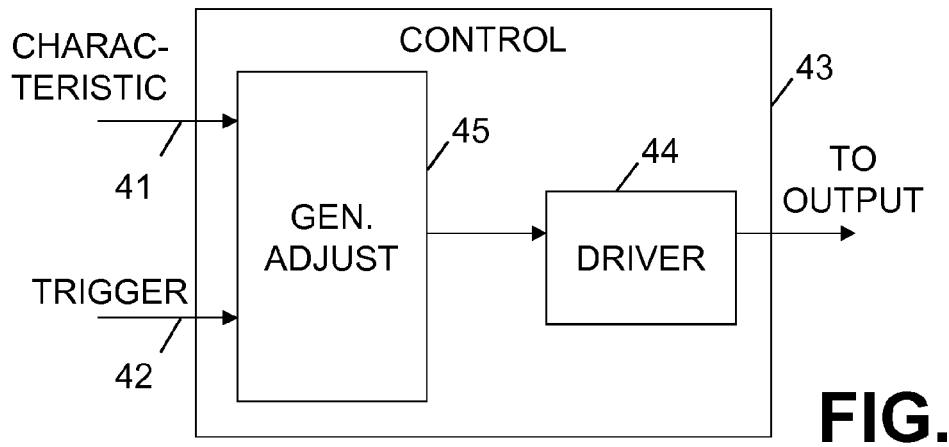
FIG. 8-10 are schematic diagrams of various embodiments of the controller.

FIG. 8 is a schematic diagram of an embodiment of the controller. Controller 43 includes adjustment generator 45 and driver 44. Adjustment generator is configured to receive characteristic 41 of audio signal and (trigger) signal 42. Signal 42 may be configured to control whether adjustment generator 45 should generate an adjustment to the setting. If signal 42 indicates that an adjustment should be generated, adjustment generator 45 may generate the adjustment based on input characteristic 41.

Figure 9:
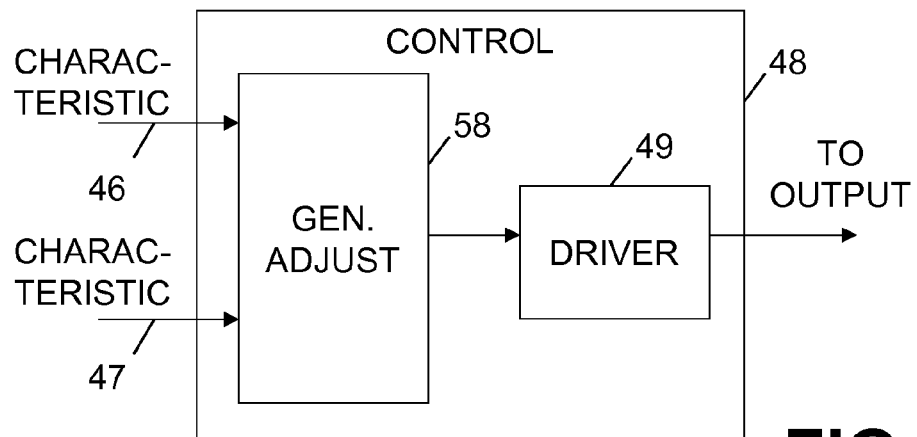
Figure 10:
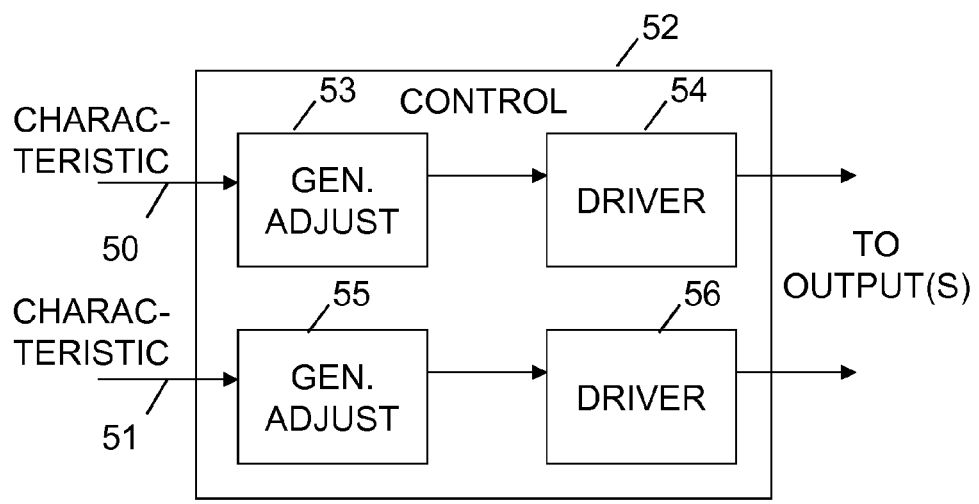

FIGS. 9 and 10 are schematic diagrams of some embodiments of the controller. Controller 48 includes adjustment generator 58 and driver 49. In this embodiment, a plurality of characteristics of the audio signal (inputs 46,47) are provided to adjustment generator 58. In this schematic, a variation in at least one of the plurality of characteristics is used to generate a new value for a setting of the apparatus (e.g., to be provided to driver 49). Alternatively, each of the plurality of characteristic (i.e., inputs 50,51) may be separately be provided to an adjustment generator (i.e., adjustment generators 53,55) and the adjustments generated separately drive different settings of the apparatus (e.g., different settings for a particular output or different settings for different outputs) via a plurality of drivers (i.e., drivers 54,56).

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the vocal input (or acoustic input produced by the user) is able to drive a singing lighting system. As such, a variation in the characteristic of the audio signal representative of the vocal input may direct or drive variation in both lighting and sound output in a substantially smooth/continuous fashion.

In another illustrative embodiment, a sound producing element can be added to a lighting system that results in the reverse effect of the current invention, i.e. sound produced by the lighting system. As an example, a space equipped with recessed ceiling luminaires (e.g. 1.2×1.2 m light tiles) that vary their lights (in intensity and colour temperature) cyclically and gradually between two settings may be used for such a system. One cycle (up and down) typically lasts about 3 minutes. Two extreme settings of the light-cycle may be: "Dim": very low light intensity (1-10 lux) of a very low colour temperature (warm light, 2700K), and "Bright": very high light intensity (>1000 lux) of a very high colour temperature (cool light, 17000K). With the changes in light intensity a vocal sound is played that gradually changes, see Table 1.

TABLE 1

Illustrative changes in system settings while gradually going from
left to right and back from right to left in, e.g., 3 minutes

| Vocal Sound: | | oeee | oeea | aaaa | aaa | |
|---|---|---|---|---|---|---|
| Tone height: | low | → | → | → | → | high |
| Light: | dim | → | → | → | → | bright |
| | (1-10 lux, warm 2700 K) | | | | (>1000 lux, cool 17000 K) | |

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable non-transitory storage medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A user interface for providing an output signal, said output signal adapted to control an apparatus, said user interface comprising:
   an audio processor configured to determine a variation in a first characteristic of an audio signal that is received from an acoustic sensor, wherein said audio signal is representative of a non-linguistic acoustic input produced by a user and wherein the variation is within a portion of a substantially continuous range of values of the first characteristic; and
   a controller configured to generate the output signal wherein the output signal is varied within substantially continuous range of values of the output signal for controlling the apparatus, and wherein the variation in the output signal is proportionally to the variation in the first characteristic.

2. The user interface according to claim 1, wherein the audio processor is further configured for processing the audio signal to derive a second characteristic of the audio signal.

3. The user interface according to claim 1, wherein said variation in the first characteristic of the audio signal is related to a temporal change in a frequency component of the audio signal.

4. The user interface according to claim 1, wherein said variation in the first characteristic of the audio signal is related to a change in a duration of a frequency component and/or an amplitude component of the audio signal being maintained over a period of time.

5. The user interface according to claim 1, wherein:
   said audio processor is further configured to process the audio signal to determine whether the audio signal meets a trigger criterion; and
   said controller is configured to generate the output signal in response to determining that the audio signal meets the trigger criterion.

6. The user interface according to claim 2, wherein said controller is further configured to generate the output signal in accordance with a variation in the second characteristic.

7. The user interface according to claim 2, wherein said controller is further configured to adapt the output signal and/or generate another output signal on the basis of at least one of the first characteristic and the second characteristic.

8. The user interface according to claim 1, wherein the output signal is adapted to control at least one setting of the apparatus, the apparatus being a lighting apparatus, and said at least one setting comprising at least one of: a color setting, a hue setting, a saturation setting, a color temperature setting, an intensity setting, spectral setting, directionality setting, and angular distribution setting.

9. A system comprising at least one of a lighting apparatus and a sound apparatus, wherein either or both apparatus are controllable by a user interface according to claim 1.

10. A method for providing an output signal for controlling an apparatus, said method comprising:
    processing an audio signal that is received from an acoustic sensor, via an audio processor configured to determine a variation in a first characteristic of the audio signal, wherein said audio signal is representative of a non-linguistic acoustic input from a user and wherein the variation is within a portion of a substantially continuous range of values of the characteristic; and
    generating the output signal, via a controller configured to vary the output signal within a substantially continuous range of values of the output signal for controlling the apparatus, and wherein the variation in the output signal is proportionally to the variation in the first characteristic.

11. The method according to claim 10, further comprising adjusting a setting of the apparatus using the output signal.

12. The method according to claim 10, further comprising processing the audio signal to derive a second characteristic of the audio signal.

13. The method of claim 10, further comprising generating the output signal on the basis of the second characteristic.

14. The method of claim 10, further comprising adapting the output signal and/or generating another output signal on the basis of at least one of the first characteristic and the second characteristic.

15. A computer program product, implemented on computer-readable non-transitory storage medium, the computer program product configured for, when run on a computing device, executing the method according to claim 10.

16. The user interface according to claim 1, wherein said variation in the first characteristic of the audio signal is related to a temporal change in an amplitude component of the audio signal.

* * * * *